Figure 1:
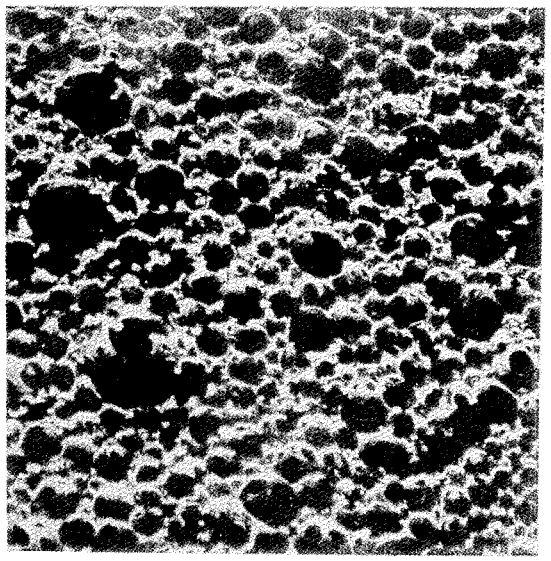

March 31, 1959     F. C. WEISSERT     2,880,182
COMBUSTION-RESISTANT NEOPRENE FOAM
RUBBER AND METHOD OF MAKING SAME
Filed Feb. 9, 1955     2 Sheets-Sheet 1

INVENTOR.
FREDERICK C. WEISSERT
BY
W. A. Fraser
ATTY.

March 31, 1959 F. C. WEISSERT 2,880,182
COMBUSTION-RESISTANT NEOPRENE FOAM
RUBBER AND METHOD OF MAKING SAME
Filed Feb. 9, 1955 2 Sheets-Sheet 2

|← 1 MM →|

INVENTOR.
FREDERICK C. WEISSERT
BY W. A. Fraser
ATTY-

United States Patent Office 2,880,182
Patented Mar. 31, 1959

2,880,182

COMBUSTION-RESISTANT NEOPRENE FOAM RUBBER AND METHOD OF MAKING SAME

Frederick C. Weissert, Munhall, Pa., assignor to The Firestone Tire & Rubber Company, Akron, Ohio, a corporation of Ohio Application February 9, 1955, Serial No. 487,009

2 Claims. (Cl. 260—2.5)

This invention relates to neoprene latex foam and more particularly to a method of producing neoprene latex foams having improved resistance to combustion, "Neoprene latex" is used herein in the usual sense to define a polymer latex produced by aqueous emulsion polymerization of chloroprene or of mixtures of chloroprene with other polymerizable materials wherein the chloroprene is the major constituent.

Neoprene, as are many halogenated organic compounds, is essentially flame-resistant. In this respect neoprene differs considerably from natural rubber or most other synthetic rubbers. When natural rubber foam is subjected to an ignition source, the rubber foam is completely consumed by violent combustion accompanied by flame. This is true even when the ignition source is quickly removed from the rubber foam. When neoprene foam, on the other hand, is subjected to an ignition source, the neoprene barely supports a flame and when the ignition source is removed the neoprene flame goes out. Despite neoprene's inherent resistance to combustion accompanied by flame, neoprene foam tends to undergo a flameless combustion accompanied by the evolution of sufficient heat to render this combustion self-propagating. Tendency for self-propagating combustion of a neoprene foam rubber increases with increase in size of the foam rubber. When a piece of neoprene foam is heated at, for example, about 200° C. or more the neoprene foam chars completely without apparent flame and loses about one-half of its weight. Additionally, when a portion of neoprene foam is brought in contact with a red hot metal object, it will be noted that the neoprene foam first chars in the vicinity of the red hot object and that the charring spreads throughout the remainder of the foam accompanied by a glowing appearance as of red hot coals or embers. This last phenomenon is often referred to as "after-glow." At temperatures substantially above 200° C., neoprene foam chars and the char itself burns. Combustibility of neoprene foam under any of these conditions, of course, is undesirable and detracts greatly from the many other desirable properties of the material.

An object of the present invention is, therefore, to produce neoprene foam rubbers which are more combustion-resistant than heretofore known neoprene foam rubbers. An additional object of the invention is to provide a neoprene foam rubber which is particularly adapted to being made essentially completely combustion-resistant. Still another object is to provide methods of making combustion-resistant neoprene foam rubbers.

In accordance with known procedures neoprene foam rubbers are conventionally produced by whipping or beating a neoprene latex compound to a froth or foam, causing the froth or foam to set to an irreversible gel and vulcanizing the gelled froth. In already known procedures various compounding ingredients including foam producing agents, vulcanizing ingredients, antioxidants, plasticizers, gelling agents and the like are incorporated into the neoprene latex. Suitable foam producing agents include casein, ordinary soaps such as the alkali metal and ammonium soaps of fatty acids, sulfonated naphthalene derivatives, sulfated alcohols or the like. Suitable vulcanizing ingredients include sulfur, sulfur donating materials, metal oxides such as zinc, magnesium, lead, calcium or other metal oxides, and various accelerators or antioxidents, etc., such as metallic salts of dialkyl dithiocarbamates, catechol, butyraldehyre-aniline condensation products, triethyl trimethylene triamine, meta- or para-dinitrobenzene, phenyl-beta-naphthylamine, hydroquinone, monobenzyl ether or the like. Suitable gelling agents are the alkali metal silicofluorides, ammonium salts of inorganic acids such as ammonium nitrate, ammonium sulfate or the like, nitroparaffins, polyvinyl methyl ether and the like. Suitable plasticizers include light and medium mineral oils, palm, castor and other vegetable oils, alkylated vegetable oils, petrolatum and the like. Petrolatum is particularly desirable as a tack reducer.

It has been found that by using in most respects the same general procedure and the same general classes of compounding ingredients referred to above but by making certain critical variations from heretofore followed procedures, neoprene foam rubber can be produced in accordance with the present invention which is more combustion-resistant than heretofore known neoprene foam rubbers and is particularly adapted to additional treatment by suitable treating agents whereby to render the neoprene foam substantially completely combustion-resistant. The critical features of the invention include (1) use of a small amount of foam producing agents such as soap or the like, (2) addition of substantially all plasticizer to the latex compound during or preferably after (not before) frothing of the latex compound and (3) adjusting the time required for gelling the latex froth to not less than about six minutes after the gelling agent has been admixed with the froth. Heretofore, plasticizers such as petrolatum and the like have been incorporated in the latex compound prior to maturation, or at least prior to foaming.

Figure 2:
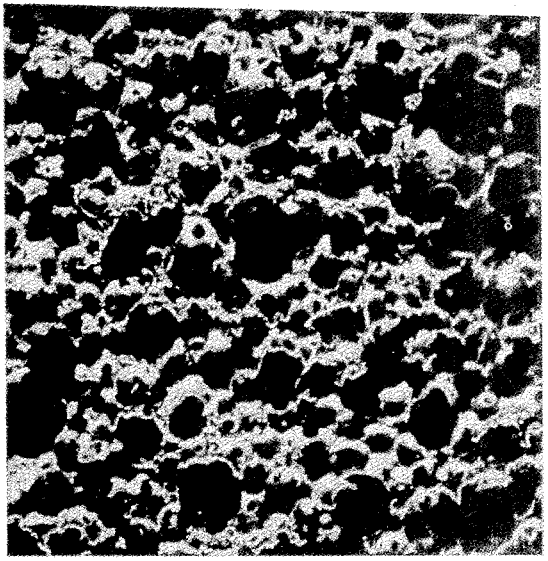
Figure 3:
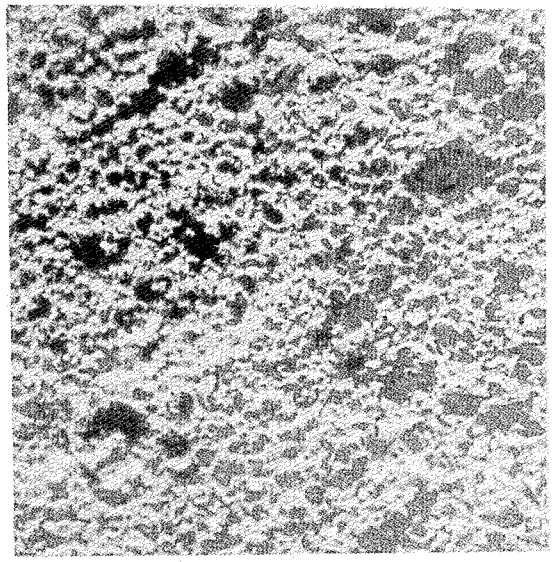

A more complete understanding of the invention may be had by the description which follows along with the accompanying drawings wherein:

Fig. 1 and Fig. 2 are photomicrographs of sections of neoprene rubber foam in accordance with the invention magnified 14 diameters; and Fig. 3 is a photomicrograph of a section of neoprene rubber foam, also magnified 14 diameters but not in accordance with the invention.

As an illustration of a neoprene rubber foam in accordance with the invention a basic neoprene latex compound is prepared by mixing together the following ingredients:

| | Parts by weight (dry) |
|---|---|
| Neoprene latex (about 60% total solids) | 100.0 |
| Potassium castor oil soap (35%) | 1.5 |
| Triethyl trimethylene triamine (50%) | 2.0 |
| Sulfur (50%) | 2.0 |
| Agerite White (40%[1]) | 1.5 |
| Fine thermal carbon black | 1.0 |

[1] Supplied by R. T. Vanderbilt Company, Inc. as sym. di-betanaphthylparaphenylene diamine.

All of the above ingredients are used as aqueous dispersions or solutions having the designated contents. The above basic compound is matured at 80° F. for 80 hours. The matured latex compound is then mechanically whipped to a foam of the desired final volume and further whipped until the foam is smooth. This whipping operation requires about 6 minutes. To the foam are added the following materials in the amounts and in the order shown:

| | Parts by weight (dry) |
|---|---|
| Triethyl trimethylene triamine (50%) | 0.5 |
| Tepidone [1] (47%) | 0.5 |
| Petrolatum (50%) | 6.0 |
| Staflex BR [2] (50%) | 5.5 |
| Zinc oxide (50%) | 3.0 |

[1] An aqueous solution of sodium dibutyl dithiocarbamate supplied by E. I. du Pont de Nemours.
[2] Butylated castor oil supplied by Deecy Products Company.

Mixing of the above materials into the neoprene foam compound is completed in about 5 minutes. A gelling agent for the neoprene latex is then added slowly in an amount suitable to effect gelling of the foam in approximately 8 minutes (in this instance sodium silicofluoride in an amount equal to 1.0 part by weight). The complete foam mixture is then poured into a suitable mold and allowed to set to an irreversible gel whereupon the gelled foam is subjected to vulcanizing conditions (in this instance 45 minutes at 340° F. live steam). The vulcanized neoprene foam rubber is then stripped from the mold, washed and dried in a conventional manner and is hereafter referred to as Foam A. Fig. 1 is a photomicrograph of 14 diameters magnification of a section of Foam A. Another foam in accordance with the invention (hereafter referred to as Foam B) is produced by using generally the same procedure and formula used for producing Foam A, except that in producing Foam B, the time of gelation is adjusted to approximately 17 minutes (0.50 part by weight sodium silicofluoride is used in lieu of the 1.0 part used in producing Foam A). Fig. 2 is a photomicrograph of 14 diameters magnification of a section of Foam B.

By way of contrasting neoprene foam rubber produced by practice of the invention with neoprene rubber foam produced by practices heretofore employed, a basic neoprene latex compound is prepared by mixing together the following ingredients:

| | Parts by weight (dry) |
|---|---|
| Neoprene latex (about 60% total solids) | 100 |
| Potassium castor oil soap (35%) | 1.5 |
| Triethyl trimethylene triamine (50%) | 2.0 |
| Sulfur (50%) | 2.0 |
| Agerite White (40%) | 1.5 |
| Fine thermal carbon black | 1.0 |
| Petrolatum (50%) | 6.0 |

All of the above ingredients are used as aqueous dispersions or solutions having the designated contents. The above basic compound is matured at 80° F. for 80 hours. The matured latex compound is then mechanically whipped to a foam of approximately the same final volume used in preparation of Foams A and B and is further whipped until the foam is smooth. To the foam are added with mixing the following materials in the amounts shown:

| | Parts by weight (dry) |
|---|---|
| Potassium castor oil soap (35%) | 1.5 |
| Triethyl trimethylene triamine (50%) | 0.5 |
| Tepidone (47%) | 0.5 |
| Staflex BR (50%) | 5.5 |
| Zinc oxide (50%) | 3.0 |
| Sodium silicofluoride | 1.85 |

The complete foam mixture is then poured into a suitable mold and allowed to set to an irreversible gel. Gelation occurs in approximately 3 to 4 minutes. The gelled foam is then subjected to vulcanizing conditions (in this instance 45 minutes at 340° F. live steam). The vulcanized neoprene foam rubber is stripped from the mold, washed and dried in a conventional manner and is hereafter referred to as Foam C. Fig. 3 is a photomicrograph of 14 diameters magnification of a section of Foam C.

Referring particularly to the photomicrographs, it is seen that Foam A (in accordance with the invention) consists of a multiplicity of interconnecting cells of a generally spherical shape, the predominant number of said cells having diameters in the range of about 0.43 to 0.86 millimeter. It is noted that the structure of Foam A is open throughout and the neoprene rubber network which constitutes Foam A is of a continuous nature. The foam structure of Foam B (also in accordance with the invention) is similar to that of Foam A except that the cells of Foam B are somewhat larger than those of Foam A. The predominant number of cells of Foam B have diameters in the range of about 0.7 to 1.0 millimeter.

As distinguished from the foams of the invention, Foam C (not in accordance with the invention) has a structure in which the cell wall fragments are compacted in such a way as to offer considerable resistance to the flow fluids throughout the mass of foam; the structure of Foam A permits free flow of fluids throughout the mass of foam. The predominant number of cells of Foam C have diameters in the range of about 0.14 to 0.21 millimeter.

A sample of Foam A or B weighing approximately 65 grams is supported by wire gauze on a tripod and 4 grams of natural rubber foam are placed as a fuse inside the sample. The natural rubber foam is ignited and allowed to burn until completely consumed—about 5 minutes. After all evidence of combustion has ceased, it is noted that the sample has charred only in the vicinity of the natural rubber foam fuse and that under the conditions of the test, combustion of the sample is not self-propagating. The sample loses only a small amount of weight as a result of the test.

In contrast with the behavior of Foam A or B (in accordance with the invention) a similar sized sample of Foam C (not in accordance with the invention) is subjected to test conditions identical with those used above. After all evidence of combustion has ceased, it is noted that Foam C is completely charred. Upon weighing this sample it is determined that Foam C has lost approximately one-half its weight as a result of the test.

Neoprene foam rubbers having combustion-resistance much greater than heretofore produced neoprene foam rubber are obtained by adhering to the special features outlined above for preparing the rubber foam. Even greater combustion-resistance is obtained, however, in accordance with an additional feature of the invention involving further treatment of neoprene rubber foams having the characteristics illustrated by Foams A and B. A preferred further treatment involves incorporating into the special neoprene rubber foams of the invention a mixture of a melamine-aldehyde condensation product and a compound which releases $P_2O_5$ under combustion conditions. Preferred $P_2O_5$ producing compounds are ammonium phosphates and phosphoric acid itself. Also suitable $P_2O_5$ producing compounds include many organic compounds such as the alkyl phosphates, vinyl bis(2-chloroethyl) phosphonate, tris(2-chloroethyl) phosphate, polyphosphoryl amide and the like. In selecting an organic compound, care should be taken to avoid those which tend to over-soften neoprene rubber when used in sizeable quantities, for example, tricresyl phosphate and the like. The mixture is suitably incorporated into an already vulcanized neoprene foam by any suitable means and preferably by impregnating the vulcanized foam rubber with either a hydrocarbon or aqueous solution or suspension. It is often desirable to subject the treated foam to an elevated temperature in order to assist in permanently binding the mixture to the rubber foam.

Suitable melamine-aldehyde condensates are conveniently prepared by heating melamine with formaldehyde in an aqueous solution to produce a methylol-melamine. The aqueous solution of methylol-melamine is mixed with a $P_2O_5$ producing compound and the mixture is then used in the practice of the invention. Alternatively, the methylol-melamine, prior to mixing with a $P_2O_5$ producing compound, can be reacted with an alcohol such as methyl, ethyl, propyl, butyl and similar alcohols to produce an alkoxy methylol-melamine which is also suitable for use in the practice of the invention. For the purpose of this application, therefore, the term "melamine-aldehyde condensation product" includes the various alkoxy methylol-melamines as well as the unalkylated methylol-melamine. Although not essential for obtaining the desired results, it is often preferable to include a catalyst for aiding the formation of a resin from the melamine-aldehyde compound in the mixture of melamine-aldehyde condensate and $P_2O_5$ producing compound.

As an illustration of the further combustion-resistance obtained by treating special neoprene foam rubbers of the invention with a mixture of a $P_2O_5$ producing compound with a melamine-aldehyde condensation product, also in accordance with the invention, neoprene foam rubber produced by the previously outlined procedure (Foam A or B) is immersed in a bath having the following formula:

| | Pounds |
|---|---|
| Resloom HP [1] | 160.0 |
| Diammonium phosphate | 40.0 |
| Catalyst AC [2] | 8.3 |
| Water | 285.0 |

[1] A methylol-melamine supplied by Monsanto Chemical Company.
[2] Supplied by Monsanto Chemical Company as a curing aid for methylol-melamines.

The treated sample is then run through squeeze rolls, dried to a constant weight and heated to cure the resin. A neoprene foam rubber containing in the neighborhood of at least about 7 parts by weight, based on the weight of rubber, of the above mixture can be subjected to the full flame of a Fisher burner for 10 minutes with substantially no combustion of the treated neoprene foam. The minimum quantity of the mixture which will effect essentially complete combustion-resistance will vary somewhat but ordinarily will not exceed about 25 parts by weight per 100 parts neoprene foam. Of course, any desired greater quantity can be utilized.

Neoprene rubber foams, heretofore produced and having structures typified by Foam C, are essentially completely consumed under the very severe conditions of the above Fisher burner test, even when such foams contain melamine-aldehyde-phosphate mixture, particularly when the amount of such mixture is no more than about 15 percent of the weight of the foam. Much larger amounts of melamine-aldehyde-phosphate mixture are always required to effect combustion-resistance of these prior art neoprene foams approximating the combustion-resistance of the foams of the invention. In many instances it is impossible, regardless of the amount of the mixture, to effect combustion-resistance of such prior art neoprene foams approximating the combustion-resistance of the foams of the invention.

I do not wish to be restricted to any particular theory. However, certain possible explanations of the effectiveness of the invention may be as follows. Without incorporation of any special fire retardant, neoprene foam rubbers of the invention are more combustion-resistant than heretofore produced neoprene foams. Neoprene foams in accordance with the invention are more porous than prior art neoprene foams and permit cooling of the foam by freer passage of air therethrough and similarly, faster escape of any hot gases resulting from combustion therefrom.

Foam rubbers produced according to the special technique of the invention and having structures of the type resulting from such technique are rendered essentially completely combustion-resistant with greater facility than heretofore known neoprene foam rubbers by incorporation of combustion-retarding additives. Neoprene foam rubbers of the invention are much more porous than heretofore produced neoprene foams and, consequently, coating the entire surface of the foam rubber is realized with greater ease than in the case of the very fine structured, heretofore produced neoprene foam rubbers. The total surface area of neoprene foam rubber of the invention is much less than the surface area of heretofore produced foam rubbers and consequently, less of any impregnating agent is required to protect foam rubbers of the invention.

Although the preferred combustion-resistant foams of the invention are those having the described structure and containing the described mixture of melamine-aldehyde condensate and $P_2O_5$ producing compound, desirable neoprene rubber foams having improved combustion-resistance in accordance with the invention are also produced by incorporating into foams having this particular structure other additives which are effective in retarding combustion. Illustrative of such other additives are melamine-aldehyde condensates without appreciable phosphate, chlorine-containing compounds such as chlorinated hydrocarbons and the like, ammonium sulfite, ammonium chloride, ammonium silicofluoride, calcium tartrate, urea, sodium tetraborate, various antimony compounds, zinc borate and the like.

By the way of summary, neoprene rubber foams of the invention have a particularly porous, open structure, the predominant number of cells of these foams having diameters of not less than about 0.43 millimeter. This structure is conveniently obtained by combining the use of small amounts of foam producing agents particularly adapted to producing coarse foams (a particularly suitable foam producing agent of this type is potassium castor oil soap in an amount less than about 2.0 parts by weight per 100 parts neoprene in the foam) with adding essentially all of the plasticizer to the latex compound during or after foaming of the compound and adjusting the time of gelation to not less than about six minutes after a gelling agent has been admixed with the foam.

What I claim is:

1. In a method of producing vulcanized neoprene foam rubber by frothing, gelling and vulcanizing neoprene latex containing a foam producing agent, vulcanizing ingredients, a gelling agent and a plasticizer selected from the group consisting of mineral oils, vegetable oils and petrolatum, the steps of adding essentially all of said plasticizer to said latex after frothing of said latex has begun and adjusting gelation of the frothed latex by appropriate adjustment of quantities and relative types of foam producing and gelling agents to gel the froth at least six minutes after admixture of gelling agent with said latex, whereby to produce a particularly combustion-resistant cellular neoprene foam rubber wherein the predominant number of cells have diameters of from 0.43 millimeter to about 1.5 millimeters.

2. A vulcanized neoprene foam rubber produced in accordance with the method of claim 1 whereby said foam rubber has improved resistance to combustion.

References Cited in the file of this patent

UNITED STATES PATENTS

| 2,484,434 | Van Buskirk et al. | Oct. 11, 1949 |
| 2,566,964 | Scholz et al. | Sept. 4, 1951 |
| 2,650,206 | Stock | Aug. 25, 1953 |

OTHER REFERENCES

L. S. Bake: "Neoprene Sponge," Report No. 44–1, November 1944, Du Pont Chemical Corp.